Oct. 27, 1953    J. W. McNAIRY    2,657,299
COFFEE MAKER
Filed Dec. 13, 1947
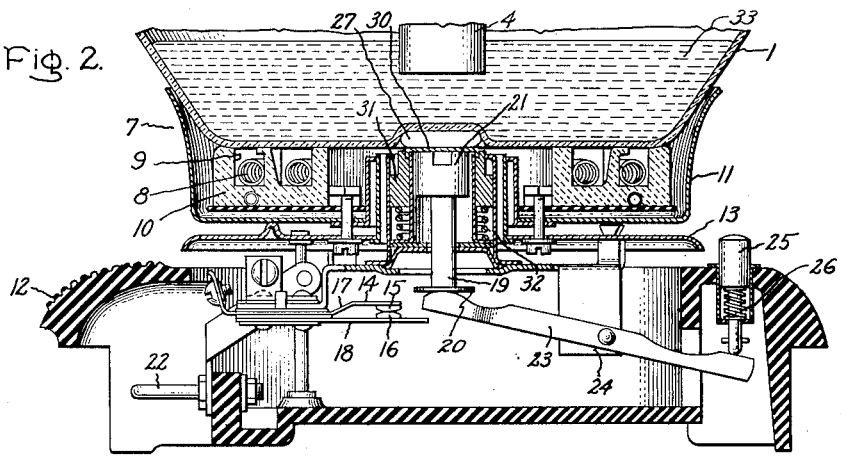
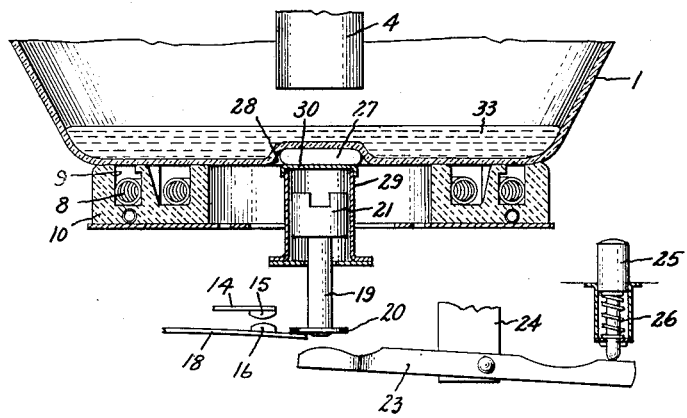
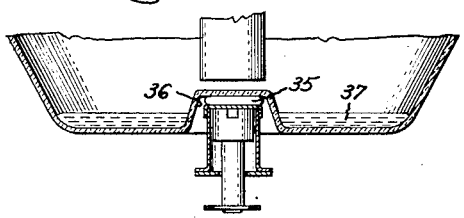
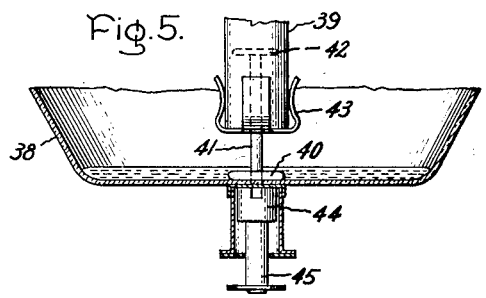
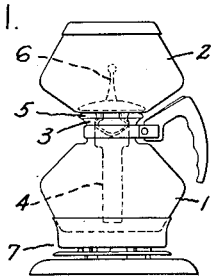
Inventor:
Jacob W. McNairy.
by Alfred E. Robet
His Attorney.

Patented Oct. 27, 1953

2,657,299

UNITED STATES PATENT OFFICE 2,657,299

COFFEE MAKER

Jacob W. McNairy, Westport, Conn., assignor to General Electric Company, a corporation of New York Application December 13, 1947, Serial No. 791,629

2 Claims. (Cl. 219—43)

This invention relates to coffee makers, more particularly to coffee makers of the vacuum type wherein heated water is transferred from a water heating bowl to a coffee infusion bowl where the brew is made and thereafter is returned to the water heating bowl when the heat applied thereto has been reduced sufficiently, and it has for its object the provision of an improved device of this character.

This invention contemplates the provision of an improved coffee maker of this character which in a simplified and improved manner automatically reduces the heat applied to the water heating bowl after the water has been transferred to the infusion bowl so that the coffee brew is automatically caused to return to the water heating bowl.

In accordance with this invention, a magnet is used to control the heat to reduce the application of heat to the water heating bowl when the magnet is moved from one position where heat is applied to another position. The magnet is retained in the first position to permit heat to be applied by an armature. This armature is in good thermal relation with the water heating bowl and it has the characteristic that it substantially changes its magnetic properties when the water in the water heating bowl attains the boiling point. Thus, when the water has been substantially transferred from the water heating bowl to the infusion bowl and the temperature of the residual water in the heating bowl rises substantially to the boiling point, the armature changes its magnetic properties, with the result that the magnet is permitted to move to the second position to shut down the heat.

For a more complete understanding of this invention, reference should be had to the accompanying drawing in which Fig. 1 is a vertical elevation of a vacuum-type coffee maker embodying this invention; Fig. 2 is a fragmentary sectional view taken through a part of the apparatus shown in Fig. 1 and drawn to a larger scale than is Fig. 1; Fig. 3 is a fragmentary view illustrating certain of the elements of Fig. 2, but in a different operating condition; Fig. 4 is a view similar to Fig. 3 but illustrating a modification of this invention; and Fig. 5 is a view similar to Fig. 3 and 4 but illustrating still another form of this invention.

Referring more particularly to Figs. 1, 2 and 3, this invention has been shown in one form as applied to a vacuum-type coffee maker comprising a lower water heating bowl 1 and an upper coffee infusion bowl 2. The lower bowl is provided at its upper end with an upright neck 3 within which a depending liquid transfer tube 4 provided on the lower end of the upper bowl 2 is received. A suitable sealing gasket 5 is inserted in the neck 3 of the lower bowl and is provided with a centrally arranged aperture to receive the tubular extension provided on the upper bowl. As shown in Fig. 1, the lower end of the transfer tube 4 terminates just above the central area of the bottom wall of the water heating bowl 1. Seated within the bottom of the coffee infusion bowl 2, over the mouth of the liquid transfer tube 4 is a suitable filter 6. It will be observed that the vertical central axes of the two bowls 1 and 2 and of the transfer tube 4 are substantially coincident.

It will be understood that in the operation of coffee makers of this type, water is placed within the water heating bowl 1, while the coffee grounds are placed within the infusion bowl 2 above the filter 6. When the water in the lower bowl is heated a pressure is created above its liquid level, and eventually this pressure becomes so great that it forces the water up through the water transfer tube 4 into the infusion vessel 2 where the coffee brew is made. When the heat is removed from the lower bowl 1, the water vapor therein condenses, and the resulting vacuum created is sufficiently great to cause the prepared coffee brew in the upper bowl to pass through the filter 6 to the bowl 1.

The two bowls 1 and 2 are supported by means of a stove or hot plate heater 7 which is arranged to apply heat to the bottom wall of the bowl 1. The stove comprises a helical resistance conductor 8 mounted in channel 9 provided for it in a suitable electrically insulated supporting brick 10. The brick 10, together with the resistance conductor 8 mounted therein, is mounted within a shallow pan-like casing 11. The casing 11 is mounted upon a suitable base 12 formed of a suitable electrically insulated material such as phenol condensation product. The bottom wall of the case 11 is spaced above the top surface of the base 12, as shown, and interpositioned in this space is a heat deflecting baffle 13 spaced both from the bottom wall of the case 11 and the upper surface of the base 12.

The energization of the resistance conductor 8 is controlled by means of a switch 14 located in base 12 and having a relatively fixed contact 15 and a coacting movable contact 16. The contact 15 is mounted upon a conducting arm 17, while the contact 16 is mounted upon a flexible conducting arm 18. The two arms 17 and 18 are connected in the energizing circuit of resistance heater 8 from the twin supply terminals 22 so that the contacts 15 and 16 are connected in series with heater 8, whereby when these contacts are in engagement with each other the heater is energized, and when they are separated it is deenergized. The switch arm 18 by its inherent resiliency biases the contact 16 upwardly to engage contact 15, and it is moved downwardly to open those contacts against the force of the bias by means of a plunger pin 19; this pin at its lower end has an abutment or collar 20 which overlies the extremity of surface arm 18, as shown, so as to depress contact 16 when the pin is depressed. The pin 19 extends vertically up in the central axis of the coffee maker and at its upper end it carries a weighted member 21. The weight of the member 21 and of the pin 19 is sufficiently great to open the switch contacts 15 and 16 when they are released to move downwardly. The members 19 and 21 are moved upwardly to permit the switch to close by means of a lever 23 pivoted intermediate its ends to a bracket 24 depending from the baffle plate as shown. The left end (Figs. 2 and 3) of lever 23 is located below collar 20 on rod 19 so that when the lever is moved clockwise from its position of Fig. 3 to its position of Fig. 2 it elevates the weight 21. The lever is moved in this way by means of a plunger button 25 mounted in the base 12 and normally biased to an upper position by means of a compression spring 26. When the button 25 is depressed, it moves the lever 23 clockwise to elevate the weight and thereby permit the switch 14 to close.

The weight 21 is formed of a permanent magnet material. In other words, the weight 21 is a permanent magnet. And the magnet is held in its upper position of Fig. 2 by means of a disk-shaped armature 27, in which position the switch contacts 15 and 16 are closed to energize heater 8. The armature 27, as shown, is mounted at the central area of the bottom wall of the water heating bowl 1 and under this bottom wall. And preferably it is located in a depression 28 formed in the bottom wall, as shown. The armature is permanently attached to the bottom wall 9 in a suitable manner, as by means of a suitable adhesive.

The magnet 21 moves within a cylinder 29 formed of a suitable non-magnetic material, such as brass. Mounted above the upper end of the cylinder is a cap 30, also formed of a non-magnetic material such as brass, and which has a depending bushing 31. A compression spring 32 biases this bushing and attached cap upwardly so that it bears against the armature 27.

With the exception of the character of the armature 27, the foregoing construction is substantially like that described and claimed in the United States patent to W. R. Weeks, 2,287,583, dated June 23, 1942.

In accordance with this invention, the armature 27 which holds the magnet 21 up in the heat applying position is formed of a magnetic material which substantially loses its magnetic properties at the boiling point of water, that is, 212° F. Stated definitely, the material of which the armature 27 is made has a high magnetic permeability at ordinary room temperature, but it has a very low permeability at 212° or a temperature slightly above this. Any suitable magnetic material having this characteristic may be used; one such metal is known commercially as Curie metal.

In the operation of the coffee maker, when the button 25 is depressed it operates the lever 23 clockwise to elevate the magnet 21 to its upper position of Fig. 2 in which position it will be held by the attractive force acting between the armature 27 and the magnet, and in this position heat will be applied by the resistance 8 because the switch contacts 15 and 16 will be closed.

As described above, the water 33 in the lower heating bowl will be heated by the heater and eventually a pressure will be created above its free level which will force it up the tube 4 and into the infusion bowl 2. All of this time the armature 27, which in fact is in thermal contact with the water through the thin section of the bottom wall of the bowl 1, has substantially the temperature of the water. During the transfer process the temperature of the water rises, and eventually when substantially all of it is forced into the upper bowl, the residual amount remaining in the lower bowl, as indicated in Fig. 3, will be boiling violently. That is, substantially at the time the main portion of the water has been transferred, the temperature of the residual body will rise to the boiling point, and substantially at this time the armature 27 loses its magnetic properties. When this happens, the magnet 21 is released and it drops down to open the contacts 15 and 16 to shut off the heat to the lower bowl. As explained above, when this bowl cools, pressure is reduced and the coffee brew formed in the upper bowl 2 is forced in the lower bowl 1. If desired, the warming circuit described in the aforementioned Weeks patent may be incorporated here.

The form of the invention illustrated in Fig. 4 is precisely the same as that illustrated in Figs. 1 to 3, but here the armature 35 is located in a re-entrant portion 36 having considerably more depth than has the re-entrant recess 28 of the first form. Here the armature is located above the level of the residual mass of water 37 after the transfer has been completed, as clearly shown in Fig. 4. This device is somewhat more sensitive than that shown in the first form because at the end of the water transfer the armature is uncovered and more quickly heats to the critical temperature at which it loses its magnetic properties.

The form of invention illustrated in Fig. 5 incorporates the means for moving the armature to shut off the heat described and claimed in the aforementioned Weeks patent. Here the lower bowl is indicated by the numeral 38 and the transfer tube by 39. And here the armature 40 is mounted upon rod 41, which at its upper end carries an actuator 42 located in the lower end of the transfer tube 39. The assembly of the armature 40, rod 41, and actuator 42 is attached to the transfer tube 39 by a resilient socket 43. And here the armature 40 coacts with permanent magnet 44 which controls the heater switch through the rod 45.

As fully described in the Weeks patent, the actuator 42 is elevated by the water rushing up the tube from the water heating vessel 38 and it being transferred. And in doing so it separates armature 40 from magnet 44 and thereby releases the magnet to shut off the heat. Here, however, in contradistinction to the Weeks armature, the armature 40 is made of a metal which substantially loses its permeability at the boiling point of water. This increases the sensitivity of the control in that it combines both the mechanical movement of the armature 40, as in the Weeks patent, with its characteristic of substantially losing its magnetic properties with raised temperature.

While I have shown and described particular embodiments of my invention, it will occur to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. In a coffee maker and the like, a water heating bowl having a depression in the bottom thereof extending above the level of said bottom, a support for removably receiving the bottom of said bowl, an electrically heated resistance for heating the bottom of said bowl, a circuit to the resistance, a switch on said support for controlling heating of said resistance through said circuit, said switch comprising a permanent magnet movably mounted in said support under said bowl for movement toward and away from said depression in the bowl bottom, a magnetic armature secured to said bowl in the depression, said armature below a given temperature being capable of holding said magnet in raised position toward said armature when said bowl is on said support, a pair of co-operating contacts in said resistance circuit closed when said magnet is in said raised position, means biasing said magnet toward a lower position away from said armature in which position said contacts are opened, and said armature having the characteristic that it substantially loses its magnetic properties near the boiling point of water in said bowl whereby the magnet is released and the position of the switch contacts is governed by the temperature of the armature.

2. In a coffee maker and the like a water heating bowl with a bottom surface, a support for removably receiving the bottom of said bowl, an electric heated resistance for heating the bottom of said bowl, a circuit to the resistance, a switch on said support for controlling heating of said resistance through said circuit, said switch comprising a permanent magnet movably mounted in said support under said bowl for movement toward and away from the bowl bottom, a magnetic armature carried by the outside of the bowl bottom above said magnet and located at a level at least partly above the lowest surface of said bowl bottom, said armature below a given temperature being capable of holding said magnet in raised position toward said armature when said bowl is on said support, a pair of co-operating contacts in said resistance circuit closed when said magnet is in said raised position, means biasing said magnet toward a lower position away from said armature in which position said contacts are opened, and said armature having the characteristic that it substantially loses its magnetic properties near the boiling point of water in said bowl whereby the magnet is released and the position of the switch contacts is governed by the temperature of the armature.

JACOB W. McNAIRY.

References Cited in the file of this patent

UNITED STATES PATENTS

| Number | Name | Date |
|---|---|---|
| 1,655,852 | Adams | Jan. 10, 1928 |
| 2,207,871 | Myers | July 16, 1940 |
| 2,269,162 | Newell | Jan. 6, 1942 |
| 2,287,585 | Weeks | June 23, 1942 |
| 2,339,087 | Mantz | Jan. 11, 1944 |
| 2,365,615 | Woodman | Dec. 19, 1944 |
| 2,445,591 | Sullivan | July 20, 1948 |